United States Patent

[11] 3,612,655

| [72] | Inventors | William Raymond Buchan<br>Lincoln;<br>Ralph Edward Aldrich, Woburn, both of Mass. |
|---|---|---|
| [21] | Appl. No. | 820,417 |
| [22] | Filed | Apr. 30, 1969 |
| [45] | Patented | Oct. 12, 1971 |
| [73] | Assignee | Itek Corporation<br>Lexington, Mass. |

[54] FABRY-PEROT FILTER CONTAINING A PHOTOCONDUCTOR AND AN ELECTRO-OPTIC MEDIUM FOR RECORDING SPATIALLY VARYING INFORMATION
15 Claims, 6 Drawing Figs.

[52] U.S. Cl. .................................................. 350/160,
250/213, 250/217, 350/163
[51] Int. Cl. .................................................... G02f 1/38
[50] Field of Search ........................................... 350/150,
160, 163, 164, 166; 250/217, 225, 213

[56] References Cited
UNITED STATES PATENTS

| 2,892,380 | 6/1959 | Baumann et al. ............. | 350/160 |
|---|---|---|---|
| 2,960,914 | 11/1960 | Rogers ......................... | 350/160 |
| 3,164,665 | 1/1965 | Stello ........................... | 350/160 |
| 3,322,485 | 5/1967 | Williams....................... | 350/160 |
| 3,339,151 | 8/1967 | Smith .......................... | 350/160 X |
| 3,395,960 | 8/1968 | Chang et al................... | 350/160 X |
| 3,512,870 | 5/1970 | Wilson, Jr. et al. ........... | 350/160 |
| 3,516,727 | 6/1970 | Hickey et al.................. | 350/160 |
| 3,517,206 | 6/1970 | Oliver........................... | 350/160 X |
| 3,517,983 | 6/1970 | Fein et al. ..................... | 350/160 |
| 3,410,626 | 11/1968 | Magrath........................ | 350/166 |
| 3,498,694 | 3/1970 | Hamann........................ | 350/160 |

Primary Examiner—William L. Sikes
Assistant Examiner—Edward S. Bauer
Attorneys—Homer O. Blair, Robert L. Nathans and David E. Brook ABSTRACT: An electro-optic filter is disclosed having a Fabry-Perot structure including an electro-optic medium whose index of refraction varies as a function of the intensity of an electric field applied to it, means for applying an electric field to the medium, and means for varying the intensity of the electric field to shift the spectral response characteristic and optimum transmissivity range of the structure.

RALPH E. ALDRICH
WILLIAM R. BUCHAN
INVENTORS.

BY Joseph S. Iandiorio

ATTORNEY.

RALPH E. ALDRICH
WILLIAM R. BUCHAN
INVENTORS.

BY *Joseph S. Iandiorio*

ATTORNEY.

FABRY-PEROT FILTER CONTAINING A PHOTOCONDUCTOR AND AN ELECTRO-OPTIC MEDIUM FOR RECORDING SPATIALLY VARYING INFORMATION

BACKGROUND OF INVENTION

This invention relates to variable wavelength electro-optic filters, and to such a filter of the Fabry-Perot type for reading out information present in electric fields.

Radiation filters of the Fabry-Perot type are used to filter out all wavelengths of radiation except one wavelength, or more realistically a narrow band of wavelengths. Each such filter must be sized and fabricated of material for the particular wavelength or band which it is to transmit. The degree of precision required is high and often costly to achieve. Further, the characteristic and size of the filter structure may vary somewhat in use due to variations in environmental conditions.

In the field of information storage and retrieval, devices are available which are capable of presenting information in the form of variations in the intensity of an electric field momentarily, as in the case of image intensifying or converting operations or for longer periods, as in the case of information stored in semiconductors, ferroelectric materials or photoelectrets. There are a number of advantages in representing information in the form of variations in the intensity of an electric field. For example, many discrete information bit locations may be contained in a very small area and no moving parts are required. But quick, efficient readout of information in the form of variations of the intensity of an electric field presents new problems because of the very small energy levels involved. For example, when the information present in the field is read out directly, electrically, low signal-to-noise ratios often occur rendering the output signal nearly useless.

SUMMARY OF INVENTION

Thus it is desirable to have available a variable electro-optic filter.

It is also desirable to have available a new method and apparatus for optical readout of information present in the form of variations in the intensity of an electric field.

It is also desirable to have available such a filter using a electro-optic medium whose index of refraction varies as a function of the intensity of an associated electric field.

It is also desirable to have available such a filter whose spectral response may be tuned to a particular wavelength by varying an applied electric field.

It is also desirable to have available such a filter whose spectral response may be varied in a pattern corresponding to the pattern of intensity variations of an electric field whose intensity variations represent a pattern of information present in it.

It is also desirable to have available such a filter whose spectral response may be cyclically varied to provide modulation of transmitted radiation in accordance with variations in an applied electric field.

The invention may be accomplished by a Fabry-Perot structure having optimum transmissivity in a predetermined range of wavelengths including an electro-optic medium whose index of refraction varies as a function of the intensity of an associated electric field. There are means for associating an electric field with the electro-optic medium and means for varying the intensity of the electric field to vary the index of refraction of the medium and shift the spectral response characteristic and optical transmissivity range of the structure. The intensity of the electric field may be varied uniformly to vary the spectral response or tune the filter structure; or it may be varied repeatedly, uniformly to spectrally modulate transmitted radiation, or it may be varied spatially in a pattern corresponding to an information pattern or image whereby the information may be converted to variations in spectral response of the filter structure.

DISCLOSURE OF PREFERRED EMBODIMENT

Other objects, features and advantages will occur from the following description of a preferred embodiment and the accompanying drawings, in which.

Figure 1:
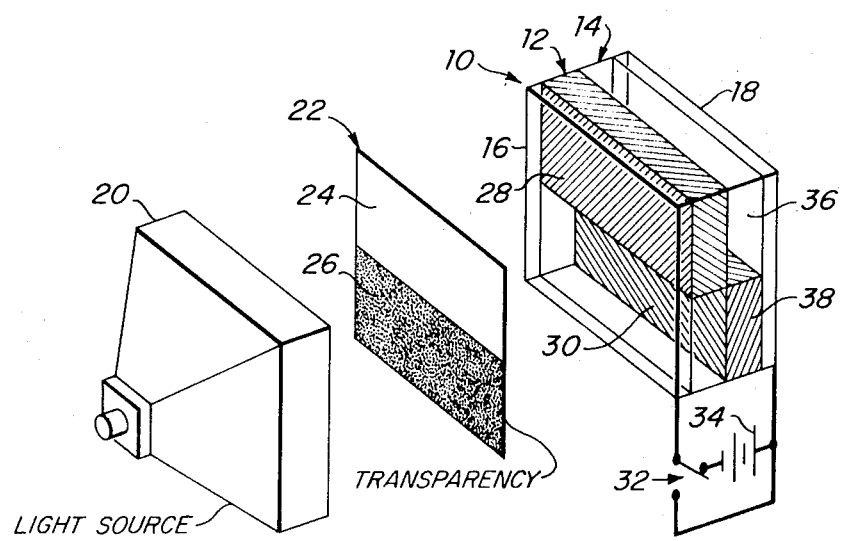
FIG. 1 is an axonometric diagram of apparatus for storing information in an electric field associated with a photoconductor and an electro-optic medium.

The invention may be embodied in a variable electro-optic Fabry-Perot interference filter whose spectral response may be shifted or tuned to a particular wavelength or band by uniformly varying an electric field across an electro-optic medium whose index of refraction varies as a function of the intensity of the applied electric field and which is disposed between the reflecting surfaces of the filter. In addition, the filter structure may be used as a spectral modulator by repeatedly, uniformly varying the intensity of the electric field across the electro-optic medium.

The invention may as well be embodied in such a filter associated with means for varying the intensity of an electric field across it in a spatial pattern representative of an information-bearing image or pattern. The filter includes an electro-optic medium whose index of refraction varies as a function of the intensity of the applied electric field so that the spectral response of the filter is varied in a spatial pattern corresponding to that of the intensity variations of the electric field.

In the latter embodiment the structure may include a filter device having an electro-optic medium between a pair of parallel, planar reflecting surfaces. The thickness of the medium between the reflecting surfaces is uniform and is chosen with regard to the index of refraction of the uncharged medium to provide an optical path length equal to a multiple of one-half the wavelength of a selected wavelength of radiation. The spectral response characteristic of the device, an interference filter of the Fabry-Perot type, is peaked at the selected wavelength and decreases for radiation of greater or lesser wavelength. At least a portion of the response characteristic has a steep slope so that small changes in wavelength provide large changes in the intensity of radiation transmitted by the device. The spectral response characteristic is shifted towards and away from the origin along the X axis by variations in the index of refraction of the electro-optic medium, which are caused by variations in the intensity of an electric field acting on the medium, and which cause variations in the optical path length of the device, thus also in its spectral sensitivity. Radiation of a wavelength having an ordinate at the center of the steep portion of the characteristic is shone through the device and the intensity of transmitted radiation is increased or lessened in accordance with the index of refraction of the portion of the device irradiated by that radiation. The intensity of the transmitted radiation, therefore, varies as a function of the intensity of the electric field whereby optical readout of the electric field is afforded.

The reflecting surfaces may be mirrors, interfaces between one-quarter-wavelength-thick layers of substances of different refractive index or any other arrangement of optical means that result in reflection and that are arranged about a layer of material to provide an optical path length between reflections equal to an integral multiple of one-half the length of a selected wavelength. When both surfaces are partially reflecting, radiation of selected wavelength is substantially transmitted while other wavelengths are substantially absorbed or reflected. When one of the surfaces is fully reflecting and the other is partially reflecting, radiation of a selected wavelength is reflected and other wavelengths are substantially absorbed.

The readout radiation may be of any wavelength included in the spectral response characteristic for which a variation therefrom produces a noticeable variation in intensity of the transmitted or reflected radiation. The readout may be performed serially using a scanning beam of radiation or in parallel by irradiating the entire device simultaneously. Able to be read out by means of this invention are stored field such as provided by a device having an electro-optic layer of e.g. KDP, DKDP, lithium niobate combined with a photoelectret layer of e.g. amorphous ZnS, ZnSe, ZnTe, CdS; or a device having a layer exhibiting both electro-optic and photoelectret properties e.g. ZnS, ZnSe, ZnTe, CdS; combined with a blocking layer e.g. polystyrene, $SiO_2$; or a device having a layer containing an electro-optic and a ferroelectric medium e.g. barium titanate, bismuth titanate combined with a layer of an amorphous photoconductor and momentary fields provided by devices having a layer containing a photoconductor and electro-optic medium, e.g. CdS and KDP. The storage devices may be distinguished from the momentary or real time devices by presence of a blocking medium for preventing charge leakage to maintain the electric field for a substantial period of time. The blocking medium may be a separate dielectric layer or may be an electro-optic medium which also functions as a blocking layer.

Information may be stored in a device 10, FIG. 1, having photoconductor layer 12 and electro-optic layer 14 between transparent electrodes 16, 18 by exposing layer 12 to an information-bearing image produced by radiation from source 20 passing through transparency 22. For purposes of illustration, the image on transparency 22 includes but one light portion 24 and one dark portion 26. The image is cast on layer 12 through electrode 16 and substantially increases the conductivity of section 28 of layer 12 struck by the high intensity radiation passing through low-density portion 24 of transparency 22 and only minimally increases the conductivity of section 30 of layer 12 struck by low-intensity radiation passing through high-density portion 26 of transparency 22. With switch 32 in the position shown battery 34 creates a field between electrodes 16, 18 which appears at nearly full strength across section 36 of electro-optic layer 14 because of the high conductance of section 28 but at very low strength across section 38 of layer 14 because section 30 of layer 12 still has a relatively high resistance. If switch 32 is moved to the position which shorts electrodes 16, 18, the surface charge at the electrodes is dissipated but the charge that has penetrated layer 12 remains for a period of time due to the presence of layer 14 which acts as an electrically blocking layer.

For readout an electro-optic medium with the electric field associated with it is disposed between a pair of planar, parallel reflecting surfaces to form a Fabry-Perot interference filter structure. The structure is arranged for optimum transmission of radiation of a particular wavelength by providing an optical path length through the medium equal to an integral multiple $m$ of one-half the wavelength $\lambda$ of that radiation, where the optical path length is defined as the actual distance $d$ traveled by the radiation in the medium multiplied by the index of refraction $n$ of the medium:

$$m\lambda/2 = nd.$$

Figure 2:
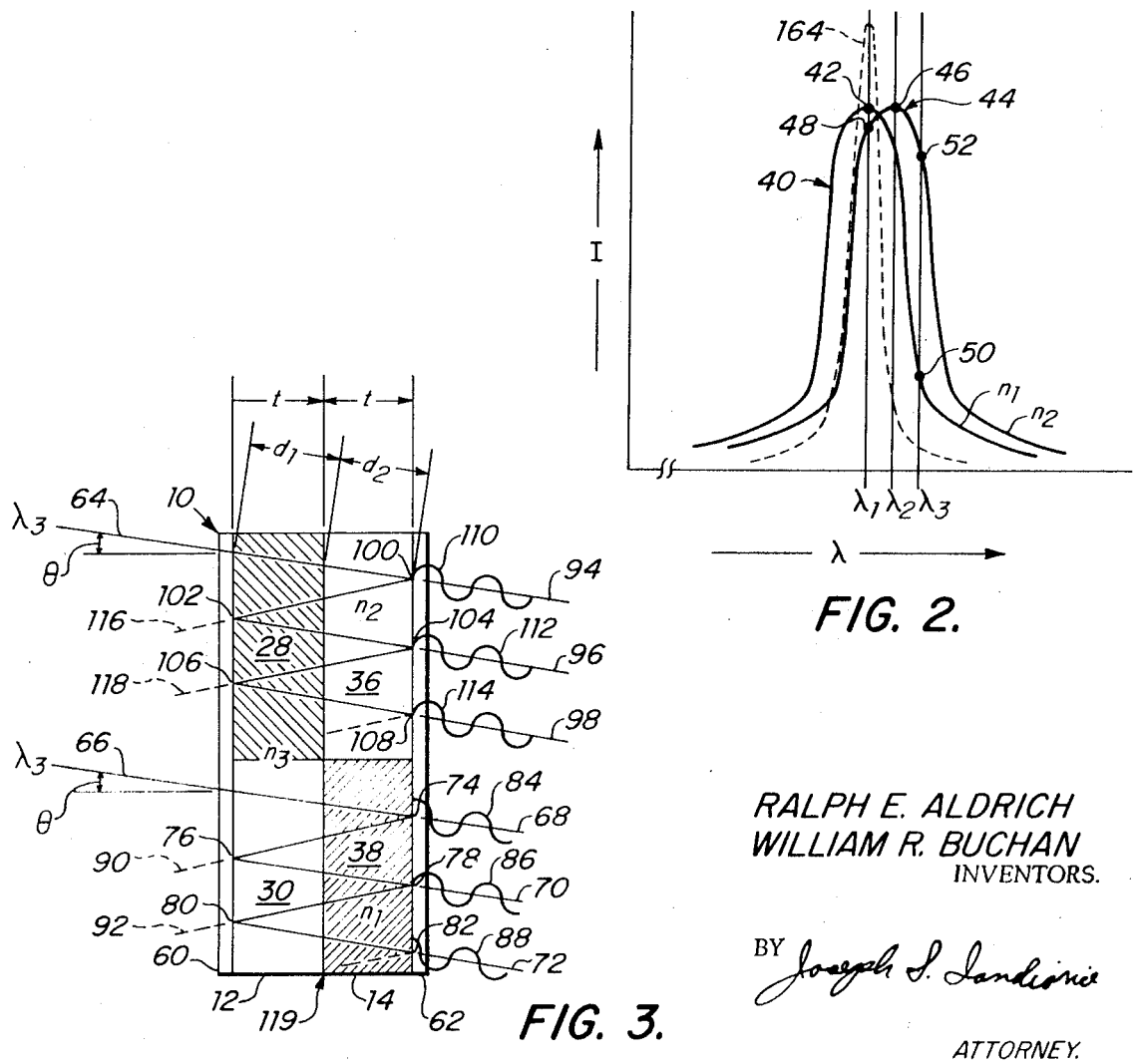
FIG. 2 depicts spectral response characteristics of certain electro-optic filter devices.

The spectral response characteristic of such a structure is shown in FIG. 2, which is a plot of intensity $I$ versus wavelength $\lambda$ of the transmitted radiation. Specifically, curve 40 is a characteristic for an interference filter structure having an index of refraction $n_1$ and distance $d_1$, resulting in peak response 42 at wavelength $\lambda_1$; and curve 44 is a similar characteristic for a structure having a higher index of refraction $n_2$ and the same distance $d_1$ resulting in a peak response 46 at wavelength $\lambda_2$. As is apparent from these two curves, a change in $n$ during exposure to radiation of a particular frequency causes a change in the intensity of radiation of that wavelength transmitted by the filter structure: a filter structure having the response characteristic of curve 40 for an index of refraction $n$ provides the highest transmissivity of radiation at wavelength $\lambda_1$, peak 42, but when the response characteristic is shifted up the wavelength ordinate by an increased index of refraction, the transmissivity for radiation of wavelength $\lambda_1$ decreases; point 48 on curve 44. Thus, as the index of refraction varies as a function of the intensity of the applied electric field, so the transmissivity of the filter structure similarly varies, and the intensity of the transmitted radiation is therefore a function of the information pattern established in the electric field. Preferably, the filter structure having the response characteristic of curves 40, 44 for indices of refraction $n_1$, $n_2$ is subjected to radiation at wavelength $\lambda_3$ at a point 50 on a steep portion of the curve where a small change in the index of refraction results in a large change in transmissivity: when the index of refraction changes from $n_1$ to $n_2$, the transmission level for $\lambda_3$ radiation rises from point 50 on curve 40 to point 52 on curve 44.

The operating point 50 may be positioned on the curve between the maximum intensity point and either one of the minimum intensity points: the minimum point corresponding to a wavelength greater than that at the maximum point or the minimum point corresponding to a wavelength smaller than that of the maximum point.

Figure 3:
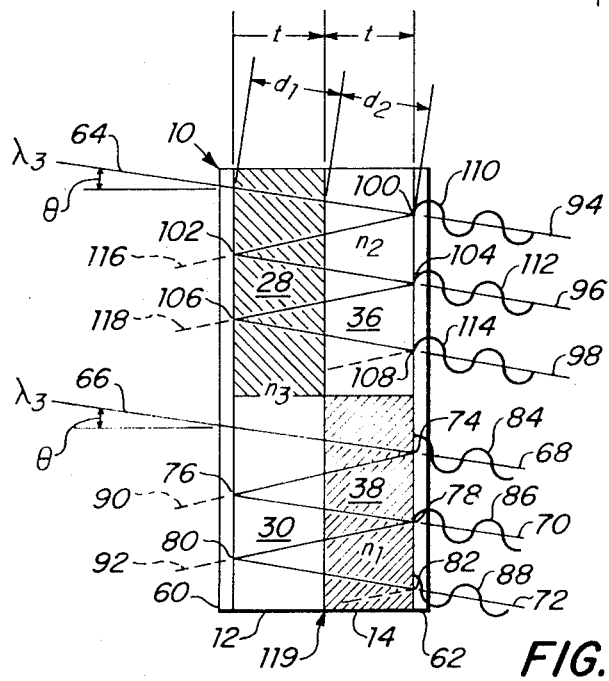
FIG. 3 is a diagrammatic view of a configuration for optimizing the spectral response of an electro-optic filter device showing the phase change occurring to radiation of a particular wavelength upon passing through portions having different indices of refraction.

An interference filter similar to the one described in connection with FIG. 2 employing the device 10 of FIG. 1 is shown in FIG. 3 where device 10 is disposed between plane, parallel, partially reflecting surfaces 60, 62, which may also perform the function of the electrodes 16 and 18. Each layer 12, 14 of device 10 has a thickness $t$ which establishes a distance of propagation $d$ through each of layers 12 and 14 for rays 64, 66 of radiation of wavelength $\lambda_3$ incident on surface 60 at an angle $\theta$. The optical path length for ray 66 is expressed as:

$$n_3 d_1 + n_1 d_2$$

and is not equal to $$m\lambda/2_3$$

where $m$ is an integer and $\lambda_3$ is the wavelength of incident radiation: the transmissivity of section 38 is shown by point 50 on curve 40, FIG. 2. Since the optical path length is not quite equal to an integral multiple of one-half the wavelength $\lambda_3$, the transmitted rays 68, 70, 72 emerging from surface 62 as the ray 66 reflects back and forth between points 74, 76, 78, 80, 82 are not in phase as displayed by sinusoidal wave shapes 84, 86, 88. Therefore, those emerging rays and similar rays 90, 92, emerging from surface 60, tend to cancel each other resulting in low-intensity radiation being emitted from the area of device 10 proximate section 38.

Similarly, the optical path length for ray 64 is expressed as:

$$n_3 d_1 + n_2 d_2$$

and is very nearly equal to $$m\lambda/2_3:$$

the transmissivity of section 36 is shown by point 52 on curve 44, FIG. 2. In section 36 in contrast to section 38 since the optical path length is very nearly equal to an integral multiple of one-half the wavelength $\lambda_3$, the transmitted rays 94, 96, 98 emerging from surface 62 as the ray 64 reflects back and forth between points 100, 102, 104, 106, 108 are nearly in phase as displayed by sinusoidal wave shapes 110, 112, 114. Therefore, those emerging rays and similar rays 116, 118 emerging from surface 60 tend to reinforce each other resulting in high-intensity radiation being emitted from the area of device 10 proximate section 36. The value of $n_3$ should be as close as possible to the values of $n_1$ and $n_2$ in order to minimize the effect of the boundary 119 between layers 12 and 14. The effect of any mismatch between $n_3$ and $n_1$ and $n_2$ may be minimized by making each layer provide an optical path length of a multiple of one-half the wavelength to which the filter is tuned. This may be done either by selection of materials with similar indices of refraction, or by adjusting the layer thickness to compensate for differences in the indices of refraction.

Figure 4:
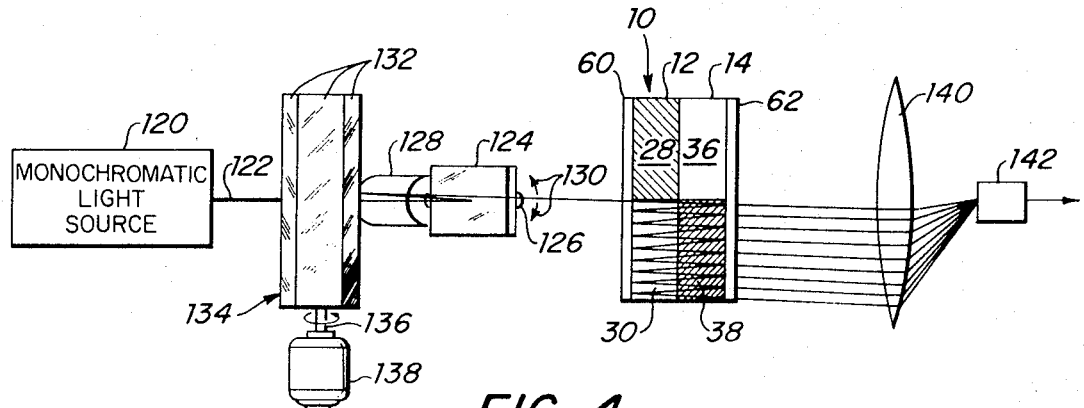
FIG. 4 is a diagrammatic view of apparatus for reading out information stored in the device of FIG. 1 according to this invention.

Apparatus for reading out an information-bearing electric field associated with an electro-optic medium in a filter structure, FIG. 3, is shown in FIG. 4 including a radiation source 120 having a wavelength $\lambda_3$, such as a laser or other monochromatic radiation source. The ray or beam 122 is directed to mirror 124 mounted on shaft 126 driven by motor 128 to oscillate in the directions shown by arrows 130. As mirror 124 oscillates it sweeps beam 122 up and down the reflecting surfaces 132 of prism 134 rotated on shaft 136 by motor 138. As a result beam 122 scans across surface 60 in a pattern similar to a television raster. The radiation transmitted by device 10 is collected by lens 140 and sensed by detector 142 which may include a photosensitive element or elements. Since the intensity of the radiation reaching detector 142 is a function of the position of the spectral response characteristic along the wavelength ordinate, FIG. 2, which is dependent upon the index of refraction of the electro-optic layer 14, the variations in the intensity of the radiation sensed by detector 142 are a function of the variations in the intensity of the electric field, thus the information pattern therein present, with which the electro-optic layer 14 is associated. Various other readout arrangements may be used in accordance with this invention; for example, parallel readout may be accomplished by simultaneously irradiating all of surface 60 with radiation of wavelength $\lambda_3$ and sensing the output with a photosensitive area such as a large photoelectric area, a matrix of photocells, film, etc.

Figure 5:
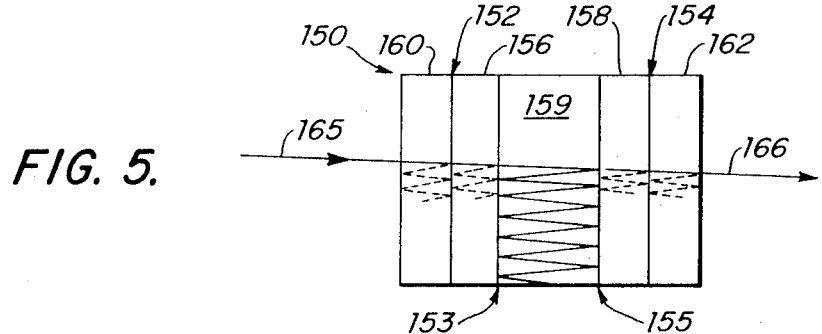
FIG. 5 is a diagrammatic view of another configuration for optimizing the spectral response of an electro-optic filter.

In addition, various other filter structures may be used such as a frustrated total reflection structure shown in "Optical Properties of Thin Solid Films," O. S. Heavens; Butterworth's Scientific Publications, London 1955, Pages 231–235 §7.6, or a multilayer Fabry-Perot-type filter structure 150, FIG. 5, wherein the reflecting surfaces are not mirrors, but are the interfaces 152, 154, between layers 156, 158 of lower refractive index and layers of higher refractive index 160, 162, and at interfaces 153, 155, between layers 156, 158 and layer 159, each of which layers has a thickness of $\lambda/4$ where $\lambda$ is the wavelength of the readout radiation. Such filters provide very high efficiency reflection resulting in a more peaked response characteristic 164, FIG. 2, with steeper sides; thus the optical transmission of the device is a more sensitive function of wavelength. Further, layer 156 (or 158) may be one of high resistance so that it functions as a blocking layer, and layers 160 and 158 (or 156 and 162) may be of low resistance and function as the electrodes. In addition to making a more highly sensitive device, this multilayer arrangement requires that only the one layer 159 be disposed between reflecting interfaces 153, 155 and so the problem of matching the indices of refraction of two layers between the reflecting surfaces, present in arrangements such as device 10, FIG. 3, is eliminated. Another feature of the multilayer structure which is particularly advantageous in read-in operations during which an image is projected on the photoconductor layer is its capability of accepting a broad range of wavelengths as far as the layer between the reflecting surfaces while presenting a steep, narrow, transmissivity characteristic for radiation passing through the structure. Layer 159 may be an electro-optic, photoconductor medium such as ZnS. The overall intensity of the input radiation 165 is significantly diminished because of the multiplicity of reflection occurring on layers 156, 158, 160, 162 and the tendency for cancellations between out-of-phase radiation in the highly selective environment of the filter structure. However, the emerging radiation 166 has a very narrow bandwidth and is therefore highly sensitive to fluctuations in the index of refraction of layer 159, thereby increasing the efficiency of the device as a readout means according to this invention. The number of layers used to filter or peak the response characteristic in the device of FIG. 5 is not limited to four as shown; the number may be varied to accommodate the intensity of the radiation source and sharpness of response desired.

Figure 6:
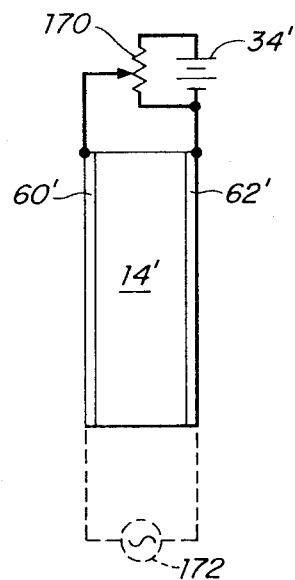
FIG. 6 is a diagrammatic view of a variable electro-optic filter according to this invention.

A variable electro-optic filter including an electro-optic layer 14' positioned between electrode-reflecting surfaces 60', 60' is shown in FIG. 6. An electric field is applied to layer 14' between electrode-reflecting surfaces 60', 62' by battery 34' and potentiometer 170. As the setting of potentiometer 170 is varied the index of refraction $n_1$ of layer 14' changes to $n_2$, thus the spectral sensitivity is shifted from a peak 42 at $\lambda_1$ to a peak 46 at $\lambda_2$, FIG. 2. In this manner the filter response is varied or tuned to different wavelengths. The variable electro-optic filter structure of FIG. 6 may include a storage capability such as described supra, so that the electric field necessary to obtain the precise desired spectral response of the filter may be stored with the electro-optic medium to maintain those particular response characteristics until they are desired to be changed. The device of FIG. 6 may as well be operated as a spectral modulator by repeatedly varying the electric field intensity across the electro-optic layer 14'. A source of varying electrical signals such as a signal generator 172 may be used to vary the field intensity across layer 14' and thereby modulate radiation transmitted by the structure.

Other embodiments will occur to those skilled in the art and are within the following claims.

What is claimed is:

1. An electro-optic apparatus comprising:
   A Fabry-Perot structure having optimum transmissivity in a predetermined range of wavelengths including an electro-optic medium whose index of refraction varies as a function of the intensity of an applied electric field;
   means for applying an electric field across said electro-optic medium; and
   means for varying the intensity of said electric field to vary the index of refraction of said medium and shift the spectral response characteristic and optimum transmissivity range of said structure, said means for varying further comprising means for optically providing an electric field whose intensity varies spatially in a pattern representative of information.

2. The apparatus of claim 1 in which said means for applying includes a pair of electrodes and a source of electrical energy connected thereto.

3. The apparatus of claim 2 in which said means varying further includes means for storing the spatial variations in the electric fields intensity after the electric field has been removed.

4. The apparatus of claim 3 further including means for exposing said structure to monochromatic radiation within said range.

5. The apparatus of claim 4 in which said means for exposing includes a laser light source.

6. The apparatus of claim 3 in which said means for optically providing includes a photoconductor medium.

7. The apparatus of claim 1 in which said structure includes first and second reflecting means disposed on opposing surfaces of said electro-optic medium.

8. The apparatus of claim 7 in which said first and second reflecting means are planar and parallel.

9. The apparatus of claim 7 in which said first and second reflecting means are partially reflecting.

10. The apparatus of claim 7 in which one of said first and second reflecting means is partially reflecting and the other is fully reflecting.

11. The apparatus of claim 7 in which first and second reflecting means include a plurality of layers of plates having a thickness of one-quarter of the wavelength of a wavelength in said predetermined range of wavelengths.

12. The apparatus of claim 1 in which said structure provides a spectral response characteristic whose intensity is maximum proximate the center of said range.

13. The apparatus of claim 12 in which said characteristic is a plot of wavelength along the X axis and intensity along the Y axis, and the wavelength of said monochromatic radiation corresponds to a point on said characteristic where the slope is of greatest magnitude.

14. The apparatus of claim 12 further including means for exposing said structure to monochromatic radiation of a wavelength between the wavelengths at the maximum and one of the minimum intensity points of said characteristic.

15. The apparatus of claim 14 in which said one of the minimum points corresponds to a wavelength greater than the wavelength at the maximum point.